United States Patent
Miyamoto (10) Patent No.: US 7,979,595 B2
(45) Date of Patent: Jul. 12, 2011

(54) EXTERNAL APPARATUS FUNCTION EXTENSION APPLICATION SYSTEM AND FIRMWARE DOWNLOAD DRIVER SYSTEM

(75) Inventor: Hideki Miyamoto, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 262 days.

(21) Appl. No.: 11/705,150

(22) Filed: Feb. 12, 2007

(65) Prior Publication Data
US 2007/0260762 A1   Nov. 8, 2007

(30) Foreign Application Priority Data
Feb. 13, 2006   (JP) .................................. 2006-035420

(51) Int. Cl.
G06F 3/00   (2006.01)
G06F 9/44   (2006.01)
G06F 9/445  (2006.01)
(52) U.S. Cl. ............. 710/8; 717/168; 717/174; 719/318
(58) Field of Classification Search .................. 710/1, 8; 717/168–178; 719/318, 328–332
See application file for complete search history.

(56) References Cited

U.S. PATENT DOCUMENTS

| 6,222,638 | B1 * | 4/2001 | Otala ........................... 358/1.18 |
| 7,284,246 | B2 * | 10/2007 | Kemp et al. ................... 719/321 |
| 7,704,147 | B2 * | 4/2010 | Quraishi et al. ................ 463/42 |
| 2005/0120103 | A1 * | 6/2005 | Godin ........................... 709/223 |

FOREIGN PATENT DOCUMENTS

JP   2006-190132   7/2006
WO   WO 99/01820   1/1999

OTHER PUBLICATIONS

Dino Esposito; Cutting Edge: Windows Hooks in the .Net Framework; Oct. 2002; msdn magazine; pp. 1-9; http://msdn.microsoft.com/en-us/magazine/cc188966.aspx.*

* cited by examiner

Primary Examiner — Alford W Kindred
Assistant Examiner — Richard B Franklin
(74) Attorney, Agent, or Firm — Dickstein Shapiro LLP

(57) ABSTRACT

An external apparatus function extension application system in a host computer is provided. The host computer sets a property value of an external apparatus into firmware that controls the external apparatus connected to the host computer and that is downloaded from the host computer to the external apparatus, and the external apparatus function extension application system includes a unit configured to register a sequence process for setting the property value as a hook function that is called when a predetermined object is generated.

6 Claims, 9 Drawing Sheets

EXTERNAL APPARATUS FUNCTION EXTENSION APPLICATION SYSTEM AND FIRMWARE DOWNLOAD DRIVER SYSTEM

BACKGROUND OF THE INVENTION

1. Field of the Invention

The present invention relates to a firmware download driver system in a host computer for downloading firmware to a USB (Universal Serial Bus) control apparatus, and also the present invention relates to a USB function extension application system in a host computer for extending functions of the USB control apparatus.

2. Description of the Related Art

Generally, in order that a USB control apparatus connected to a host computer may operate as "USB control apparatus", it is necessary that firmware is downloaded into the USB control apparatus from the host computer when the USB control apparatus connects to the host computer. A Web camera (a network camera or a digital camera) is an example of the USB control apparatus.

The USB control apparatus that connects to the host computer includes a download control unit for controlling download of firmware and an internal memory circuit for storing a program of the firmware. In addition, the download control unit includes a CPU. The download control unit with the CPU communicates with the host computer so that the firmware is downloaded into the internal memory circuit. Japanese Laid-Open Patent Application No. 2002-510416 (patent document 1) discloses a conventional technology in the USB control apparatus for downloading firmware.

When the host computer connected to the USB control apparatus operates under an environment of a standard "WINDOWS XP™" operating system, "UVC (USB Video Class) standard driver" that is a kernel of the WINDOWS XP™ operating system operates in the host computer. According to the operation of the driver, standard control is performed for the USB control apparatus. That is, the UVC standard driver operates as a driver in the host computer side for the Web camera.

By the way, when downloading firmware from the host computer, a page called "property page" is provided by the host computer as a function of an application in the host computer, wherein the property page is used for setting information (property) on functions of the USB control apparatus via the firmware that is an object. This application system in the WINDOWS XP™ operating system is usually called "Capture application". As to the Web camera, "Brightness (of an image)" and "Contrast (of an image)" are examples of resources of the property.

However, it can be sufficiently considered that functions of the Web camera increase. In addition, it can be originally considered that attributes that can be set on the property page do not adequately support the functions of the Web camera. From these points, it is desired to develop easily and flexibly an attribute setting application system that supports functions to be extended.

SUMMARY OF THE INVENTION

An object of the present invention is to construct, in a host computer, a USB control apparatus function extension application system and a firmware download driver system in which an attribute related to an extension of a function (property) of the USB control apparatus can be properly set so that the attribute is properly downloaded by the firmware. In addition, another object is to send and receive a command related to a communication bus as necessary or to additionally send a part or all of firmware.

The object is achieved by an external apparatus function extension application system in a host computer, wherein the host computer sets a property value of an external apparatus into firmware that controls the external apparatus connected to the host computer and that is downloaded from the host computer to the external apparatus, the external apparatus function extension application system including:

a unit configured to register a sequence process for setting the property value as a hook function that is called when a predetermined object is generated.

Another object is achieved by a firmware download driver system, in a host computer, for downloading firmware for controlling an external apparatus connected to the host computer to the external apparatus, the firmware download driver system including:

a unit configured to determine a command on a communication bus so as to send or receive the command, or set all or a part of information in the firmware so as to send the firmware, according to a setting value of a predetermined function issued by a kernel of an operating system when downloading the firmware.

According to the present invention, an attribute setting application system that supports extended attributes of the external apparatus can be easily and flexibly developed. In addition, when downloading firmware to the external apparatus, by monitoring a process request in the host computer, it becomes possible to send and receive a command related to a communication bus, or to send a part or the whole of the firmware additionally.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, preferred embodiments of the present invention are described with reference to drawings. Although the WINDOWS XP™ operating system is used as an operating system of the host computer in the following descriptions, it is merely an example and it is needless to say that any other operating system can be applied to the present invention, and it does not limit the scope of the present invention. In addition, although a digital camera (network camera or Web camera) is used as an example of the USB control apparatus that is an external apparatus to be connected to the host computer, it is merely an example and it does not limit the scope of the present invention.

First Embodiment

Figure 1A:
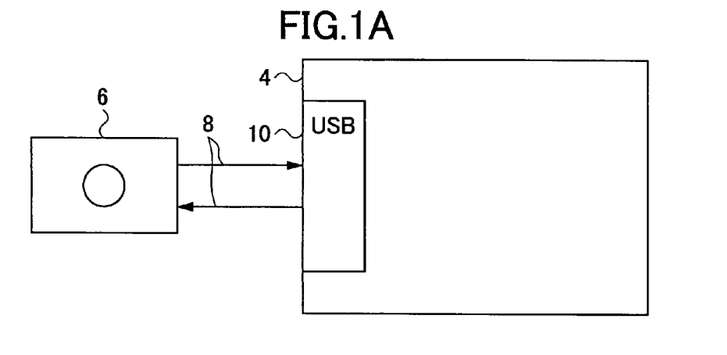
FIG. 1A is a drawing showing a schematic view of a digital camera 6 as the USB control apparatus and a host computer 4 that are connected via a USB 8 and a USB port 10 according to a first embodiment of the present invention.
Figure 1B:
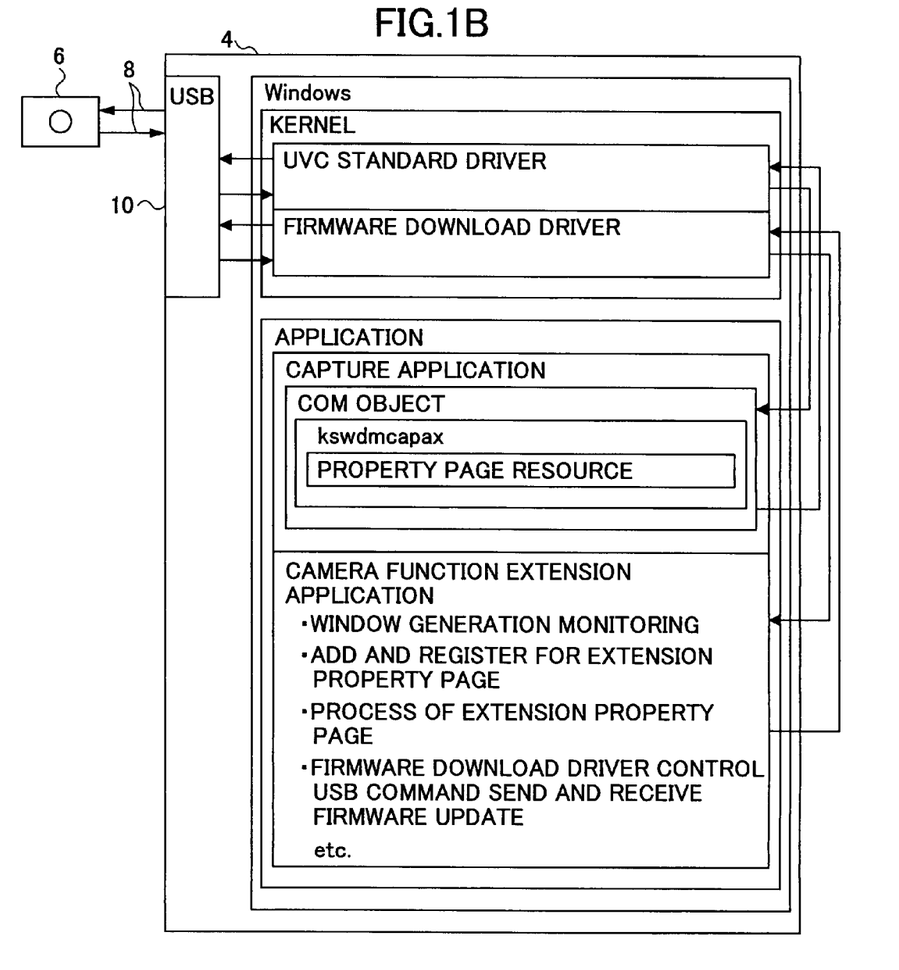
FIG. 1B is a drawing showing configurations of the firmware download driver and the camera function extension application according to the first embodiment of the present invention.

FIG. 1A shows a schematic view of a digital camera 6 as the USB control apparatus and a host computer 4 that are connected via a USB 8 and a USB port 10. FIG. 1B shows a detailed configuration of the host computer 4 shown in FIG. 1A. Especially, FIG. 1B shows configurations of a firmware download driver and a camera function extension application of the first embodiment of the present invention.

The firmware download driver is attached to the UVC standard driver that is included in the kernel. The firmware download driver includes a firmware download function of the present invention.

As an application, a camera function extension application is provided in addition to the capture application that is originally provided. As shown in FIG. 1B, the capture application specifies operation of the UVC standard driver, and the capture application sets and stores resource data using the property page, for example. The camera function extension application specifies operation of the firmware download driver. The camera function extension application performs the following functions, for example.

The camera function extension application monitors generation of a window as an object, and adds and registers an extension property page. In addition, the camera function extension application performs processes for the extension property page, and further performs firmware download driver control as shown in FIG. 1B. The firmware download driver control includes at least "USB command send and receive" and "firmware update". The extension property page is a page that is added to the property page of the capture application.

Figure 2:
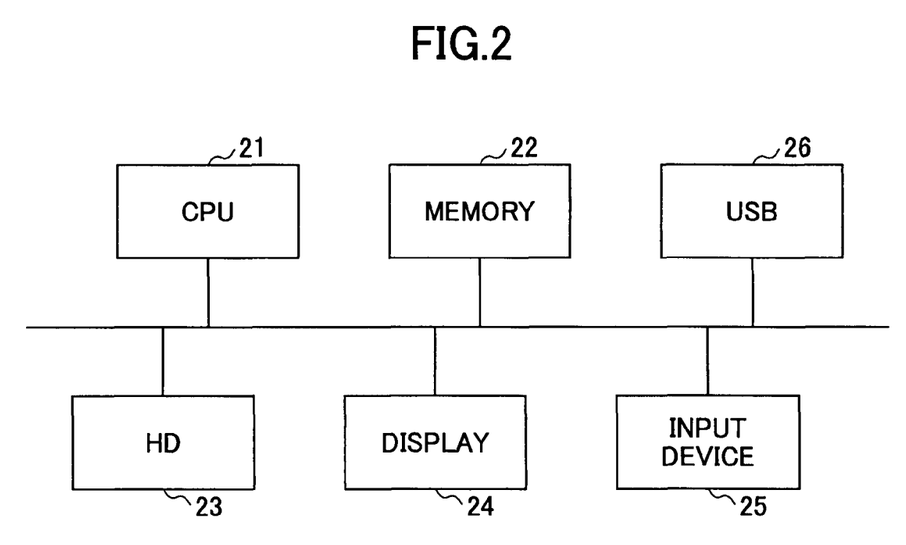
FIG. 2 is a drawing showing a configuration example of the host computer 4.

FIG. 2 shows a hardware configuration example of the host computer 4. As shown in FIG. 2, the host computer 4 includes a CPU 25 for executing a program, a memory 22 for storing programs and data, an hard disc drive 23 for storing programs and data, a display 24 for displaying images, an input device 25 inputting data or instructions and the like, and a USB interface 26. Each of programs that include drivers and applications described in this embodiment is executed by a system including the CPU 21 and the memory 22 so that operation of the program is realized. By the way, the program can be stored in a recording medium such as a CD-ROM, a memory card and the like. Then, the program can be installed into the host computer 4 from the recording medium.

In the following, operations of the firmware download driver and the camera function extension application are described.

First, operation outline of the firmware download driver is described with reference to FIG. 3. In general, the firmware download driver sends the firmware right after the firmware download driver launches. In addition, the firmware download driver sends and receives USB commands and updates a temporarily used firmware according to a request from the camera function extension application. Further, the firmware download driver performs standard processes (such as power management) for a USB device such that the digital camera and the like operates as a "USB device" (that is the USB control apparatus).

Figure 3:
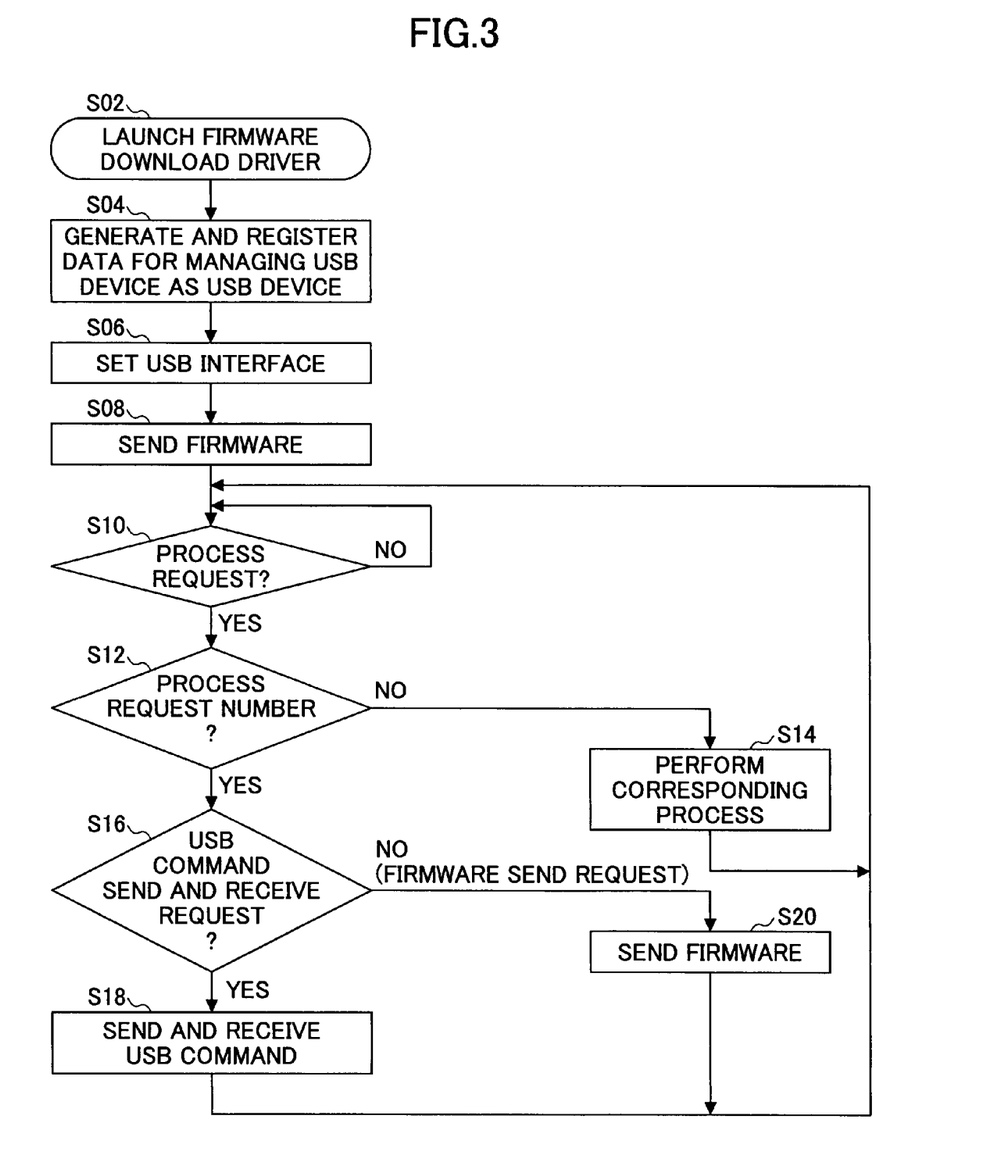
FIG. 3 is a drawing for explaining operation of the firmware download driver according to the first embodiment of the present invention.

As shown in FIG. 3, when the firmware download driver is launched in step S02, the firmware download driver generates data for managing the USB device (digital camera) as a USB device, and registers the data in step S04. Next, the firmware download driver sets up a USB interface in step S06 and sends the firmware in step S08.

Then, the firmware download driver waits for a process request in step S10. When receiving the process request, the firmware download driver determines contents of the process request in step S12. In the determination of the contents of the process request, it is desirable to use "DeviceIoControl" that is a function for providing an instruction to the driver and that is a standard function in the kernel of the WINDOWS XP™ operating system. Therefore, in step S12, it is determined whether there is a process number in "DeviceIoControl" first.

In step S12, when there is no process number in "DeviceIoControl", the firmware download driver determines to perform a standard process (corresponding process) for the USB device in step S14. The corresponding process shown in S14 may be a general process such as plug-and-play process, power management process, generation of driver object, discard of driver object, and unload of driver. After the corresponding process is performed, the firmware download driver returns to the state for waiting for a process request (step S10).

In step 14, when it is determined that there is a process number in "DeviceIoControl", it is determined whether the process request is a request for sending and receiving a USB command in step S16. When the process request is the request for sending and receiving the USB command, the firmware download driver sends and receives a USB command corresponding to the process request number in step S18. When the process request is not the request for sending and receiving a USB command, the process request is determined to be a send request for updating a firmware that is temporarily used. Thus, the firmware download driver sends a firmware (related to update) corresponding to the process request number in step S20. After sending and receiving of the USB command (step S18) or sending of the firmware (related to update) (step S20) is performed, the firmware download driver returns to the state for waiting for a process request (step S10).

Figure 4:
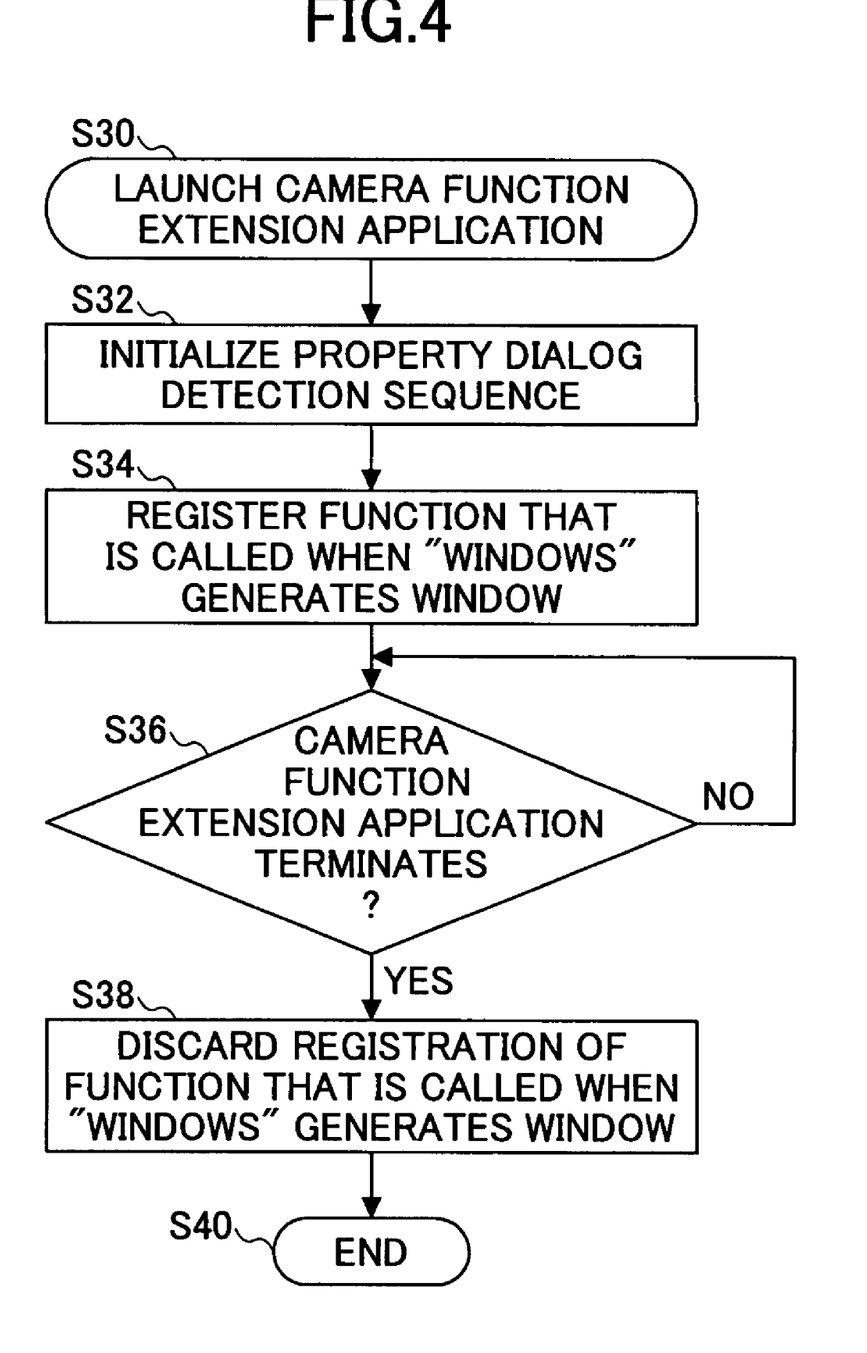
FIG. 4 is a drawing for explaining operation of the camera function extension application according to the first embodiment of the present invention.

Next, outline of operation of the camera function extension application is described with reference to FIG. 4. The main operation of the camera function extension application is to register a process function (hook function) for a hook for window generation procedure in the WINDOWS XP™ operating system. The hook in this example indicates a function for extending a function by registering a function that is called at a process timing.

When the camera function extension application is launched in step S30, the camera function extension application initializes a camera property dialog detection sequence in step S32. The camera property dialog detection sequence is described in detail later.

Figure 5:
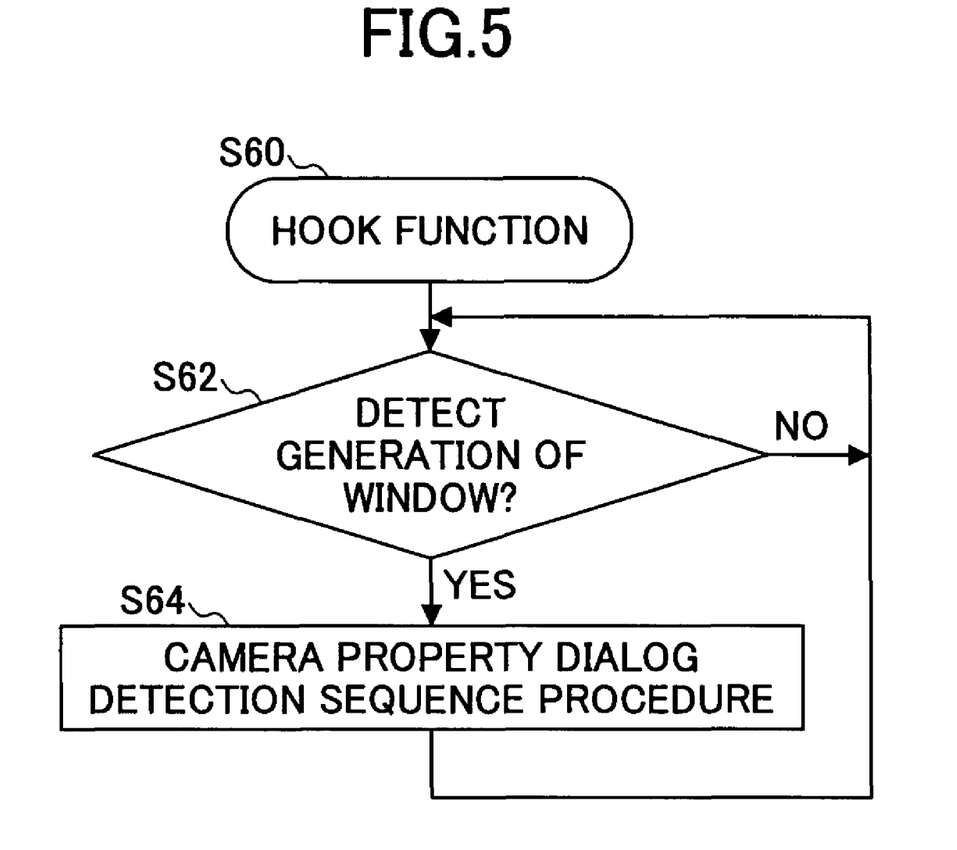
FIG. 5 is a drawing for explaining operation of the hook function according to the first embodiment of the present invention.

Next, the camera function extension application registers a function (hook function) that is called when the WINDOWS XP™ operating system generates a window in step S34. FIG. 5 shows operation of the hook function. The hook function is described later.

Until the termination of the procedure, the camera function extension application keeps the state in which the hook function is registered in step S36.

When a terminating process is performed, the camera function extension application discards registration of the hook function in step S38 and terminates the procedure.

Next, outline of operation of the hook function that is registered such that it is called when a window is generated is described with reference to FIG. 5. This function is called each time when a window that is an object is generated. In addition, this function is executed in a process of an application in which the window is generated.

The hook function waits for detection of generation of a window in step S62. When the generation of the window is detected (Yes in step S62), the hook function performs the camera property dialog detection sequence in step S64. The camera property dialog detection sequence is described later in detail. After performing the camera property dialog detection sequence, the hook function waits for detection of generation of a window again in step S62.

Next, the camera property dialog detection sequence procedure is described with reference to FIGS. 6-9.

[Sequence 1]

Figure 6:
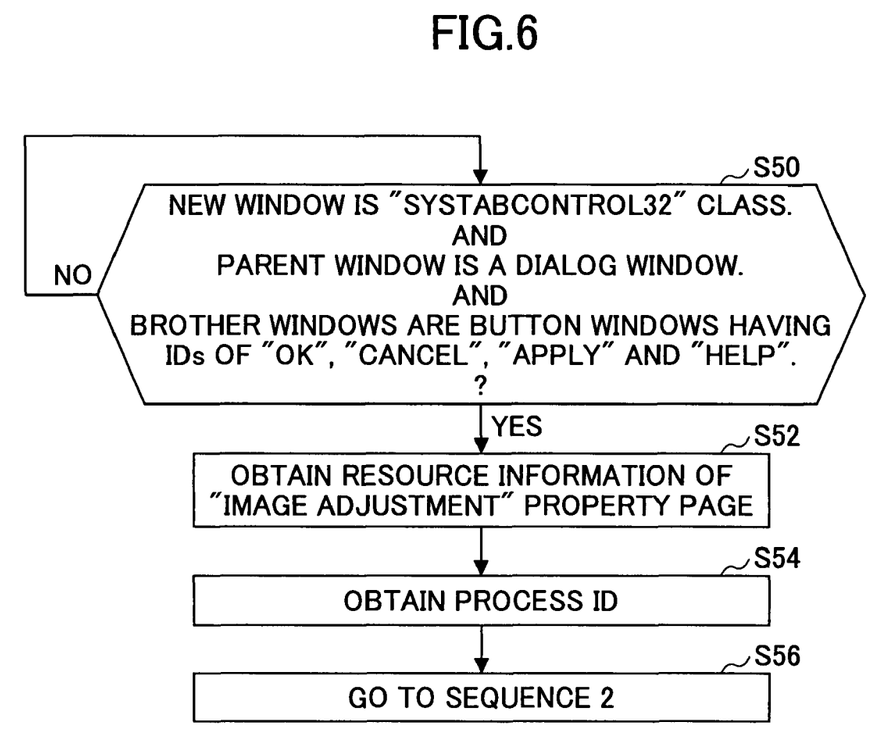
FIG. 6 is a drawing for explaining the sequence 1.

The sequence 1 shown in FIG. 6 is performed without any prerequisite. In the sequence 1, it is checked whether all of the following three conditions are satisfied first in step S50.

(1) A new window is a "SysTabControl32" class.
(2) A parent window is a dialog window.
(3) Brother windows are button windows having IDs of "OK", "Cancel", "Apply" and "Help".

The "SysTabControl32" class is a window class included in the WINDOWS XP™, and is a class for generating and managing a tab.

When all of the conditions are satisfied (Yes in step S50), following processes are performed.

The hook function obtains resource information of an "image adjustment" property page in step S52, and obtains a process ID in step S54. Then, the procedure goes to sequence 2 in step S56.

The "image adjustment" property page is an example of a property page for adjusting an image of the digital camera. The resource information is adjustment items on the page, and includes "brightness" and "contrast", for example. The "process ID" is a unique number assigned to an application. In the sequence 1, obtaining the resource information and the process ID is a main procedure.

When any one of the conditions in step S50 is not satisfied, the sequence 1 is continued.

[Sequence 2]

Sequence 2 is performed after the sequence 1 on condition that a process in which the sequence 2 is performed is the same as the process of the process ID obtained in the sequence 1.

Figure 7:
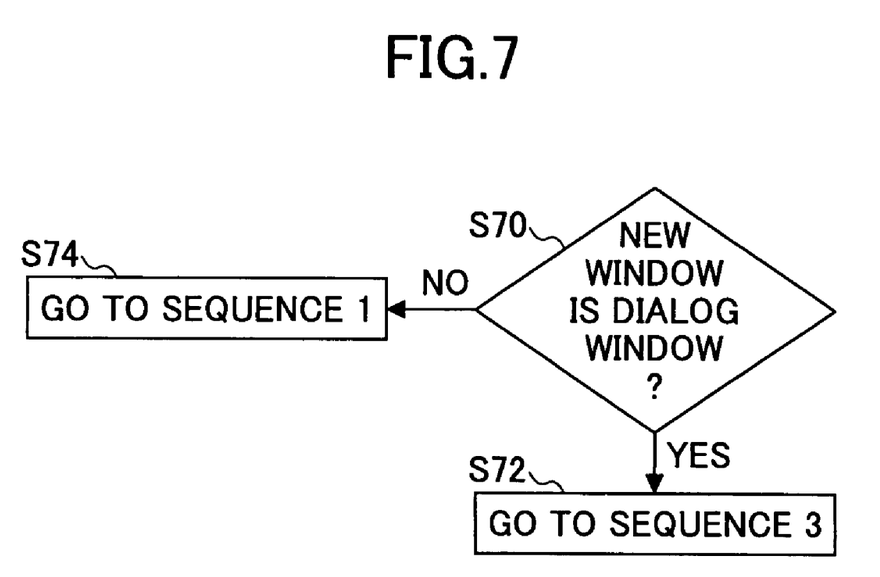
FIG. 7 is a drawing for explaining the sequence 2.

In the sequence 2, as shown in FIG. 7, it is checked whether the new window is a dialog window (a window related to dialog) in step S70. If this condition is satisfied (Yes in step S70), the procedure goes to sequence 3 in step S72. If that condition is not satisfied (No in step S70), the sequence 1 is performed in step S74. That is, in the sequence 2, on condition that the process ID is the same, if the generated window is a dialog window, the sequence 3 is performed.

[Sequence 3]

The sequence 3 is performed after the sequence 2 on condition that a process in which the sequence 3 is performed is the same as the process of the process ID obtained in the sequence 1.

Figure 8:
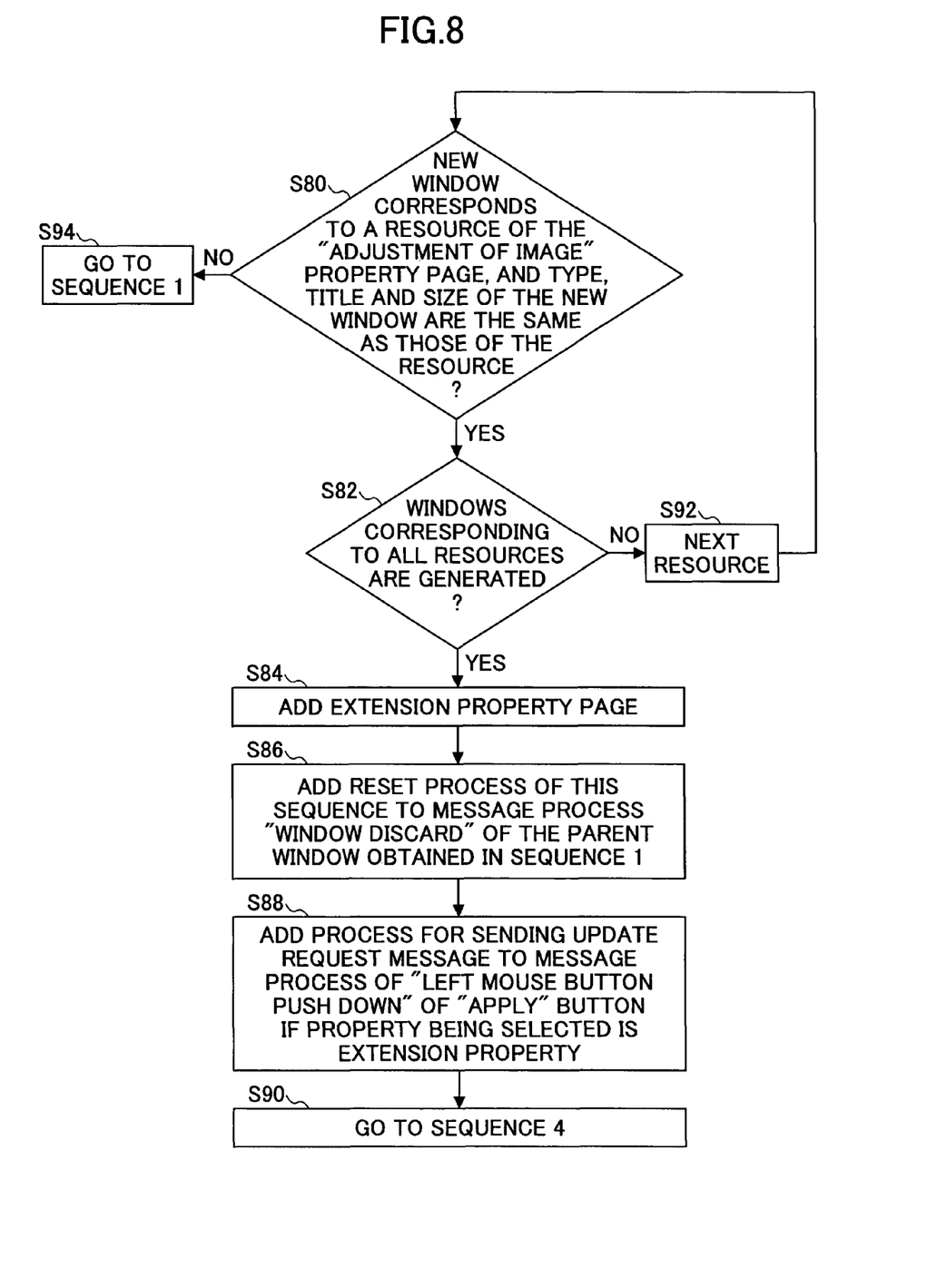
FIG. 8 is a drawing for explaining the sequence 3.

In the sequence 3, as shown in FIG. 8, it is determined whether a new window corresponds to a resource of the "adjustment of image" property page, and it is determined whether type, title and size of the new window are the same as those of the resource in step S80. If the condition of step S80 is not satisfied, the procedure goes to the sequence 1 in step S94.

If the condition in step S80 is satisfied, processes are divided based on the following condition of step S82. In step S82, it is checked whether windows corresponding to all resources of the "adjustment of image" property page are generated. That is, the main procedure of the sequence 3 is performed under the condition that the windows corresponding to all resources of the "adjustment of image" property page are generated.

If the condition in step S82 is satisfied, an extension property page is added in step S84. In addition, a reset process of this sequence is added to the message process "window discard" of the parent window obtained in the sequence 1 in step S86.

In addition, a process for sending an update request message if a property being selected is the extension property is added to a message process "left mouse button push" in "Apply button" in step S88. Then, the procedure goes to the sequence 4.

The extension property page is a page for concretely setting a property value corresponding to an extension function of the digital camera. The extension property page is added to the property page that is originally provided by the capture application. In addition, the "Apply" button is a window (object) for sending an update request message based on the message process "left mouse button pushing" for information concretely set in the property page.

If the condition in step S82 is not satisfied, a next resource becomes a next determination subject in step S92 and the sequence 3 is continued.

[Sequence 4]

The sequence 4 is performed after the sequence 3 under the following conditions (1)-(3).

(1) The process in which the sequence 4 is performed is the same as the process of the process ID obtained in the sequence 1, (2) a new window is a dialog window and (3) a parent window of the new window is the same as the parent window obtained in the sequence 1.

Figure 9:
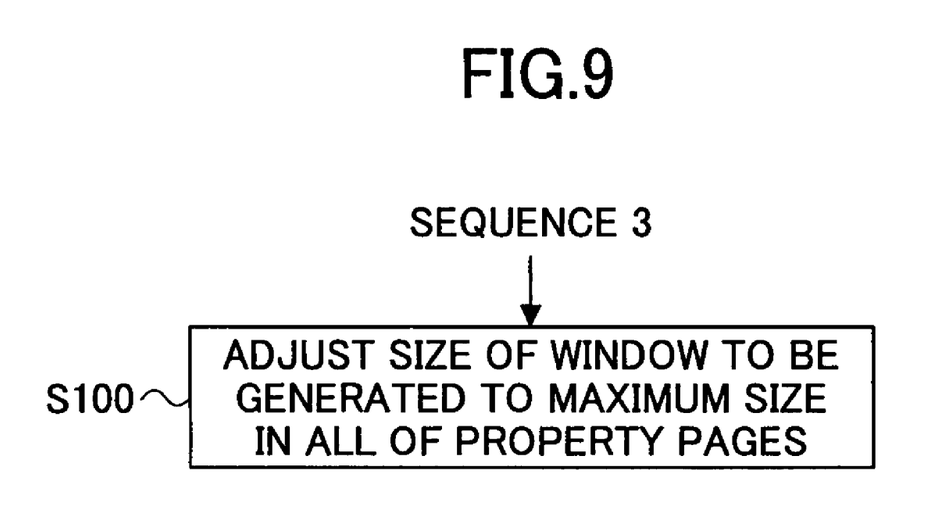
FIG. 9 is a drawing for explaining the sequence 4.

In the sequence 4, as shown in FIG. 9, a size of the window to be generated is adjusted to a maximum size in all property pages. Accordingly, all windows including the extended page can be properly displayed.

According to the embodiment, an external apparatus function extension application system in a host computer is provided, wherein the host computer sets a property value of an external apparatus into firmware that controls the external apparatus connected to the host computer and that is downloaded from the host computer to the external apparatus.

The external apparatus function extension application system includes a unit configured to register a sequence process for setting the property value as a hook function that is called when a predetermined object is generated.

In the external apparatus function extension application system, the predetermined object may be a window. The sequence process for setting the property value may includes: setting a page for obtaining the property value; and setting a condition for updating information in the firmware by the property value obtained from the page.

According to an embodiment, a firmware download driver system, in a host computer, for downloading firmware for controlling an external apparatus connected to the host computer to the external apparatus is provided.

The firmware download driver system includes a unit configured to determine a command on a communication bus so as to send or receive the command, or set all or a part of information in the firmware so as to send the firmware, according to a setting value of a predetermined function issued by a kernel of an operating system when downloading the firmware.

Other Embodiments

The present invention is not limited to the specifically disclosed embodiment, and variations and modifications may be made without departing from the scope of the present invention. For example, apparatuses other than the digital camera can be used as the USB control apparatus. In addition, the present invention can be applied to computers having an operating system other than the WINDOWS XP™ operating system.

The present application contains subject matter related to Japanese patent application No. 2006-035420, filed in the JPO on Feb. 13, 2006, the entire contents of which are incorporated herein by reference.

What is claimed is:

1. A host computer having an operating system, an external apparatus function extension application system and a firmware download driver, wherein the host computer sets a property value of an external apparatus into firmware that controls the external apparatus connected to the host computer and that is downloaded from the host computer to the external apparatus, the host computer comprising:
   a computer processor configured to register a sequence process for setting the property value as a hook function that is called when a predetermined object is generated, and to request the firmware download driver to update firmware in the external apparatus with the firmware in which the property value is set when a first process request value is set in a predetermined function in the operating system, and to request the firmware download driver to send and receive a USB command when a second process request value is set in the predetermined function.

2. The host computer as claimed in claim 1, wherein the predetermined object is a window.

3. The host computer as claimed in claim 1, wherein the sequence process for setting the property value includes:
   setting an extension property page for obtaining the property value, the extension property page being a page that provides extended attributes to a property page of the external device; and
   setting a condition for updating information in the firmware by the property value obtained from the extension property page.

4. A computer program stored on a computer-readable memory in a host computer having an operating system, wherein the host computer sets a property value of an external apparatus into firmware that controls the external apparatus connected to the host computer and that is downloaded from the host computer to the external apparatus, the computer program causing the host computer to execute steps of:
   registering a sequence process for setting the property value as a hook function that is called when a predetermined object is generated,
   requesting that a firmware download driver update firmware in an external apparatus with the firmware in which the property value is set when a first process request value is set in a predetermined function in the operating system, and
   requesting the firmware download driver to send and receive a USB command when a second process request value is set in the predetermined function.

5. The computer program as claimed in claim 4, wherein the predetermined object is a window.

6. The computer program as claimed in claim 4, wherein the sequence process for setting the property value includes:
   setting an extension property page for obtaining the property value, the extension property page being a page that provides extended attributes to a property page of the external device; and
   setting a condition for updating information in the firmware by the property value obtained from the extension property page.

* * * * *